April 4, 1950   J. H. CHAVEZ   2,503,097
GRAPEFRUIT CUTTER

Filed Nov. 17, 1948

INVENTOR.
JOHN H. CHAVEZ
BY
ATTORNEY

Patented Apr. 4, 1950

2,503,097

UNITED STATES PATENT OFFICE 2,503,097

GRAPEFRUIT CUTTER

John H. Chavez, New York, N. Y.

Application November 17, 1948, Serial No. 60,461

7 Claims. (Cl. 146—3)

This invention relates to new and useful improvements in cutters for grapefruit, and, more particularly, the aim is to provide a novel and valuable such cutter in the form of a hand tool operable in a matter of seconds for performing a severing function relative to all the pulp or meat of the fruit to subdivide such meat into a large plurality of parts disconnected one from another.

According to the present invention, which of course in to be understood as employable for any appropriate use, especially in connection with citrus fruits, two sets of relatively movable cutter elements are provided; one of such sets for simultaneously, and preferably as a first operation, subdividing the pulp or meat of a fruit half into a plurality of meat or pulp segments disconnected along radially extending lines, and the other set of the cutting elements for simultaneously, and preferably as a second operation, separating said segments from the rind of the fruit. With the device arranged for operating, and manipulated, to have its cutting elements function according to the preferred sequence just indicated, the device may also be employed as a grab or lifter means for all the said segments, for simultaneously lifting them all out of the grapefruit half, as preparatory to making a fruit cup, a fruit salad or the like.

A feature of the invention is that, with the device manipulated as just above, it may nevertheless be so manipulated, following completion of the two cutting operations, as to retract the set of cutting elements for separating said segments from the fruit rind, for freeing the device from the fruit half while leaving in the rind the segments parted therefrom and disconnected from each other.

In a now favored embodiment of the invention as by way of example illustrated herein, there are incorporated the advantages of a relatively simple construction, an adequate ruggedness throughout, and such a high degree of dependability in operation and celerity and ease of manipulation as to make the device eminently suitable for use in the home as well as in hotel and other restaurants.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
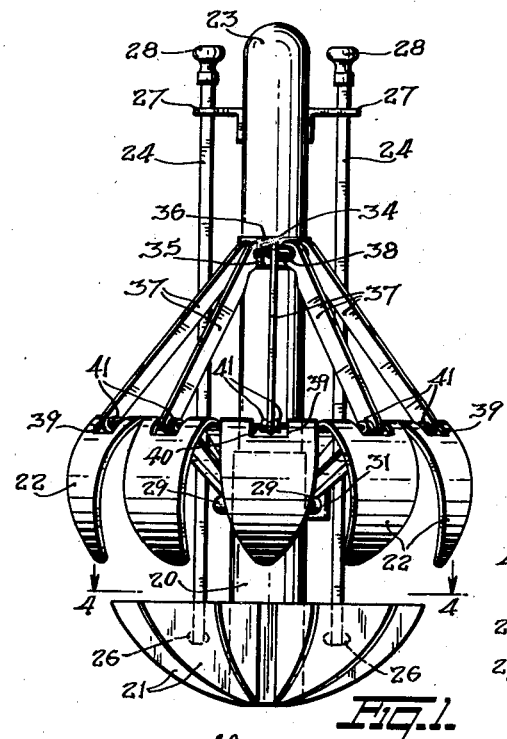
Fig. 1 is a side elevational view of the embodiment above referred to, in an intermediate adjustment of its two main telescopically connected parts, one of these being an outer tube and the other an inner tube.
Figure 3:
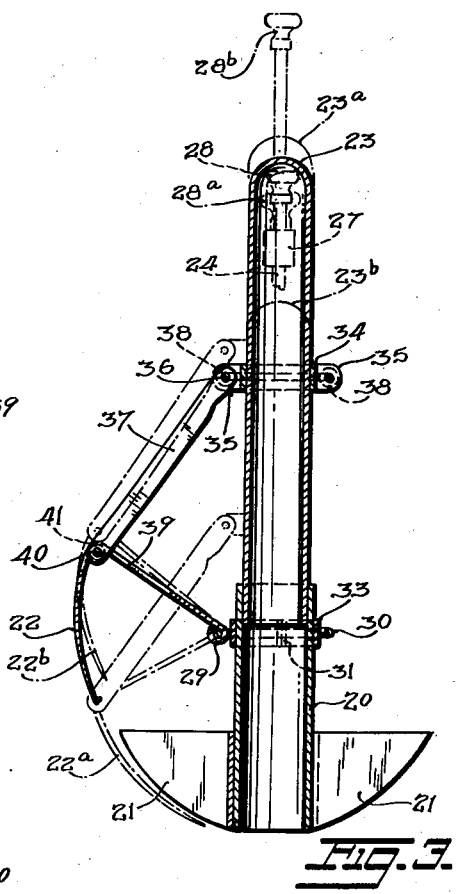
Figure 2:
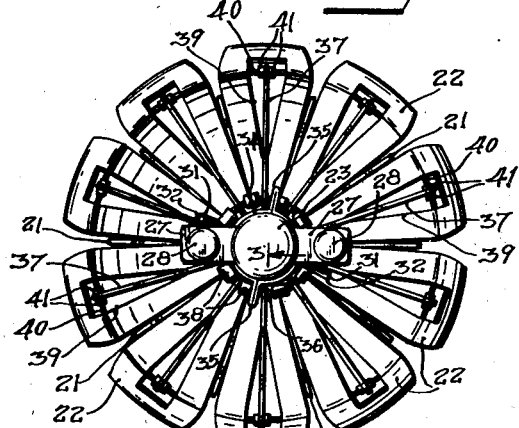
Fig. 2 is a top plan view, showing the parts as in Fig. 1.

Fig. 3 is a radial section taken substantially on the line 3—3 of Fig. 2, but showing, in aid of simplicity, merely one of the cutting elements provided for severing the outer end of a meat or pulp segment from the rind—this cutting element being shown in full lines in a disposition thereof in agreement with the delineations of Figs. 1 and 2 and in dot and dash lines in two other dispositions thereof.

Figure 4:
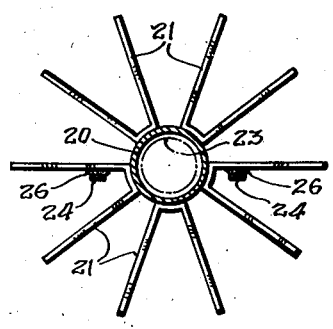

Fig. 4 is a horizontal section, taken on the line 4—4 of Fig. 1.

Figure 5:
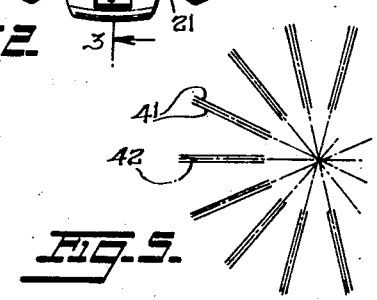

Fig. 5 is a fragmentary, somewhat diagrammatic view, and similar to Fig. 4; but illustrative of a modification.

Preliminarily, it may be noted that in Figs. 1-4, 20 indicates an outer lower tube which fixedly carries at its bottom a plurality of, herein shown as ten, radially arranged cutting blades 21; these being the blades, as hereinabove stated, preferably first functioning. Said blades 21 will below be called the straight-stroke blades.

As the first operation, with the grapefruit half at the center of its bottom rotundity resting on a suitable support, and with the device arranged substantially as shown in Fig. 1, the said straight-stroke blades 21 are all simultaneously forced down into the fruit, by endwise thrust applied to the device. For meanwhile maintaining elevated the other set of blades, 22, these also shown as ten in number—which blades 22, below called the scoops, are carried by an upper inner tube 23, said thrust is applied by way of a pair of rods 24.

Following completion of said thrust, with accompanying arrival of the bottoms of the straight-stroke blades 21 against the inner side of the rind, a downward thrust is applied to the top of said tube 23, with the result that the parts become disposed as in Fig. 3 and in accordance with the dot and dash location of a scoop 22 as there indicated at 22ª.

Now referring to Figs. 1-4 more in detail, each of two immediately adjoining straight-stroke blades 21 are shown as constituted by wing portions of a sheet member 25 bent to have a longitudinal extension defining a flat-bottomed V; these sheet members suitably rigidly secured to the tube 20. The lower ends of the rods 24 are suitably attached, as indicated at 26, to suitable points at the sides of two diametrically opposite blades 21. The upper end portions of said rods are guided in apertures carried by L-brackets 27 fixed to the tube 23 near its upper end. Above said brackets, the rods 24 carry enlarged finger-pieces 28.

The scoops 22, each shaped as shown in Fig. 1 when taken with Fig. 2, are radially arranged, uniformly circumferentially spaced around the tube 23, and placed relative to the straight-stroke cutters 21 as best shown in the views last-mentioned. The inner converging lengths of the scoops 22 are slenderized, and each scoop at the free end of its said inner length is curled over as at 29 for pivotal connection to a portion of the length of a circularly continuous wire ring 30 passing through apertured ears 31 at the exterior of the tube 23 near its upper end. The two diametrically opposite scoops 22 adjacent to said ears have ear-clearing openings 32. Said ears are shown as constituted by reentrantly bent portions of a band 33 encircling and suitably fixed to the tube 23.

At a point along the tube 23, below the brackets 27, there is secured to said tube a band 34 like the band 33, having ears 35 like the ears 31; said band for mounting a wire ring 36 like the ring 30.

A bar link 37, apertured at its upper end and there fulcrumed to a portion of the length of the ring 36, is at its lower end, where it is there also apertured, pivotally connected to each of the scoops 22. Said ring 36 carries a spacing collar 38 between each two adjoining links 37, thereby to maintain the latter properly extended. Each scoop 22 has a substantially triangular opening 39 for passage therethrough of the lower end of the associated link 37, and said link is pivotally connected to said scoop near the outer end of said opening by means including a pivot pin 40 suitably secured at its opposite ends to the underside of the scoop and carrying a pair of justifying collars one on each side of the link.

As the parts are shown in Fig. 1, the scoops 22 are elevated almost all the way but not quite to the limit of their maximum separation from the straight-stroke cutters 21; and the finger-pieces 28 are raised somewhat above the brackets 27. For a grapefruit of unusually large diameter, the finger-pieces 28 may be moved to drop their bottoms to said brackets, as indicated in dot and dash lines at 28ª in Fig. 3; thereby in effect lifting the top of the tube 23 to the location indicated in dot and dash lines at 23ª and raising the scoops 22 to the locations indicated in dot and dash lines at 22ᵇ.

With the finger-pieces 28 disposed relative to the brackets 27 either as shown in full lines or as shown in dotted lines at 28ª, the forefingers of both hands may be laid at their tips on the top of the tube 23 and therebeyond on said finger-pieces, for convenient thrust on the straight-stroke cutters 21 to drive them down into the grapefruit half until their lower curved edges, these edges fairly sharp, meet the white lining of the rind of the fruit. The lower circular edge of the tube 20 is sharpened sufficiently to cut without difficulty through the fibrous radially extending walls of the sacs containing the fruit meat or pulp.

Next, with the finger tips shifted from the finger-pieces 28, a downward thrust is applied to the top of the tube 23, thereby, while in effect lifting said finger-pieces to the locations indicated in dot and dash lines at 28ᵇ relative to the brackets 27, actually forcing the top of the tube 23 downward an equivalent amount, as indicated at 23ᵇ, and so driving down and swinging inward the outer end portions of the scoops 22, these scoops along their fruit meat intercepting edges being desirably highly sharpened, to locations corresponding to that indicated at 22ª in Fig. 3.

Now, the device may be lifted out of the grapefruit, carrying with it the ten segments of the meat or pulp of the fruit, with each of such segments pocketed between a scoop 22 and a pair of immediately adjoining straight-stroke cutters 21. On thereafter pressing down on the finger-pieces 28, the scoops will be lifted relative to the cutters 21, for drop out of said segments into a suitable bowl or other receptacle.

Also, before moving the device as a whole relative to the fruit following descent of the scoops 22, these scoops may first be raised relative to the cutters 21, and then the device may be lifted out of the fruit, leaving the meat or pulp segments therein.

It will be noted that in the construction above described, the attempt has not been made to separate the various portions of the meat or pulp individually between the fibrous sac walls abovementioned. It may be explained in this connection that, while prior to about 1875 the grapefruit native to Florida was by the Floridians found to be so unpalatable due to said sac walls that the grapefruit were used only at feeding times in the hog-pen, over the years since that time during which grapefruit has increasingly widely grown in favor as a table food, a preference has been developed for the slightly bitter taste contributed by said sac walls when left present. However, for those comparatively few who so far have not developed a liking for the sac-walls-contributed flavor, the device of the invention may be provided with a plurality of cutters corresponding to the straight-stroke cutters 21 and so arranged on the tube 20 or an equivalent that these cutters will be present in pairs, 41 as indicated in Fig. 5, to a total number of pairs equal to the number of said sac walls, with the cutters of each pair spaced only to an extent to trap therebetween one of said sac walls, these walls indicated at 42 in Fig. 5, and so for severing from said sac walls the masses of meat or pulp interposed therebetween; and with the scoops corresponding to the scoops 22, to a total number thereof equal to the total of said pairs, arranged to have fields of swing intermediate each of the two adjacent ones of said pairs 41.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A cutter especially for citrus fruits, comprising an elongate upper support, an elongate lower support slidably mounted on the upper support, a plurality of radially arranged straight-stroke cutters fixed to the lower end of the lower support, a plurality of radially arranged scoops each pivotally mounted on said lower support near the top thereof, connections between each of said scoops at a point intermediate its ends and the upper support at a point intermediate the length of the latter, and means including an actuator near the top of the upper support and operable to cause a downward movement of the lower support relative to the upper support, said supports being tubes telescopically coupled, and said connections being links each pivotally connected near one of its ends to one of said scoops and near the other of its ends to the upper support, said scoops having longitudinally curved outer portions, and the pivotal connections of said links to the scoops being adjacent the inner ends of said outer scoop portions.

2. A cutter especially for citrus fruits, comprising an elongate upper support, an elongate lower support slidably mounted on the upper support, a plurality of radially arranged straight-stroke cutters fixed to the lower end of the lower support, a plurality of radially arranged scoops each pivotally mounted on said lower support near the top thereof, connections between each of said scoops at a point intermediate its ends and the upper support at a point intermediate the length of the latter, and means including an actuator near the top of the upper support and operable to cause a downward movement of the lower support relative to the upper support, said supports being tubes telescopically coupled, and said connections being links each pivotally connected near one of its ends to one of said scoops and near the other of its ends to the upper support, said scoops having longitudinally curved outer portions, and the pivotal connections of said links to the scoops being adjacent the inner ends of said outer scoop portions, the last-named means including a push rod extending along the exterior of the upper support and guide means carried by the upper support for the upper end portion of said rod, the lower end of said rod being fixed relative to the lower support.

3. A cutter especially for citrus fruits, comprising an elongate upper support, an elongate lower support slidably mounted on the upper support, a plurality of radially arranged straight-stroke cutters fixed to the lower end of the lower support, a plurality of radially arranged scoops each pivotally mounted on said lower support near the top thereof, connections between each of said scoops at a point intermediate its ends and the upper support at a point intermediate the length of the latter, and means including an actuator near the top of the upper support and operable to cause a downward movement of the lower support relative to the upper support, said supports being tubes telescopically coupled, and said connections being links each pivotally connected near one of its ends to one of said scoops and near the other of its ends to the upper support, said scoops having longitudinally curved outer portions, and the pivotal connections of said links to the scoops being adjacent the inner ends of said outer scoop portions, the last-named means including a pair of push rods extending along the exterior of the upper support and means carried near the upper end of the upper support for guiding the upper end portions of said rods, the lower end of one of said rods being directly connected to one of the straight-stroke cutters and the lower end of the other of said rods being directly connected to another of said straight-stroke cutters.

4. A cutter for citrus fruits and the like, comprising a lower tube, an upper tube having its lower end slidably engaged in the top end of said lower tube, a plurality of equally spaced vertical cutters mounted on the bottom of said lower tube to be pressed into the citrus fruit between the segments thereof, a plurality of radially arranged scoops one disposed over the space between each adjacent pair of said vertical cutters, a ring mounted on said lower tube above said vertical cutters, means pivotally connecting said scoops to said ring, a second ring mounted on said upper tube above the upper end of said lower tube, and a link connected between each of said scoops and said second ring, whereby when said upper tube is pressed downward into said lower tube said scoops will be pivoted relative to and into position between the adjacent faces of said vertical cutters.

5. A cutter for citrus fruits and the like, comprising a lower tube, an upper tube having its lower end slidably engaged in the top end of said lower tube, a plurality of equally spaced vertical cutters mounted on the bottom of said lower tube to be pressed into the citrus fruit between the segments thereof, a plurality of radially arranged scoops one disposed over the space between each adjacent pair of said vertical cutters, a ring mounted on said lower tube above said vertical cutters, means pivotally connecting said scoops to said ring, a second ring mounted on said upper tube above the upper end of said lower tube, and a link connected between each of said scoops and said second ring, whereby when said upper tube is pressed downwardly into said lower tube said scoops will be pivoted relative to and into position between the adjacent faces of said vertical cutters, and means for pressing said vertical cutters into the fruit without requiring that said upper tube be pressed downward into said lower tube.

6. A cutter for citrus fruits and the like, comprising a lower tube, an upper tube having its lower end sidably engaged in the top end of said lower tube, a plurality of equally spaced vertical cutters mounted on the bottom of said lower tube to be pressed into the citrus fruit between the segments thereof, a plurality of radially arranged scoops one disposed over the space between each adjacent pair of said vertical cutters, a ring mounted on said lower tube above said vertical cutters, means pivotally connecting said scoops to said ring, a second ring mounted on said upper tube above the upper end of said lower tube, and a link connected between each of said scoops and said second ring, whereby when said upper tube is pressed downward into said lower tube said scoops will be pivoted relative to and into position between the adjacent faces of said vertical cutters, brackets extended radially from diametrically opposite sides of said upper tube, said brackets being formed with holes, and rods extended vertically along diametrically opposite sides of said tubes and having their bottom ends secured to diametrically opposite vertical cutters and their top ends freely passed through said holes so that pressure can be applied to said vertical cutters forcing them into the fruit without requiring lowering of said upper tube into said lower tube.

7. A cutter for citrus fruits and the like, comprising a lower tube, an upper tube having its lower end slidably engaged in the top end of said lower tube, a plurality of equally spaced vertical cutters mounted on the bottom of said lower tube to be pressed into the citrus fruit between the segments thereof, a plurality of radially arranged scoops one disposed over the space between each adjacent pair of said vertical cutters, a ring mounted on said lower tube above said vertical cutters, means pivotally connecting said scoops to said ring, a second ring mounted on said upper tube above the upper end of said lower tube, and a link connected between each of said scoops and said second ring, whereby when said upper tube is pressed downward into said lower tube said scoops will be pivoted relative to and into position between the adjacent faces of said vertical cutters, brackets extended radially from diametrically opposite sides of said upper tube, said brackets being formed with holes, and rods extended vertically along diametrically opposite sides of said tubes and having their bottom ends secured to diametrically opposite vertical cutters and their top ends freely passed through said holes so that pressure can be applied to said vertical cutters forcing them into the fruit without requiring lowering of said upper tube into said lower tube, and enlarged finger-pieces mounted on the top ends of said rods above said brackets.

JOHN H. CHAVEZ.

REFERENCES CITED

The following references are of record in the file of this patent:

UNITED STATES PATENTS

| Number | Name | Date |
|---|---|---|
| 921,917 | Troxel | May 18, 1909 |
| 1,423,490 | Vafiades et al. | July 18, 1922 |
| 1,542,352 | Ankeny | June 16, 1925 |
| 1,943,113 | Daum | Jan. 9, 1934 |
| 2,329,918 | Leavens | Sept. 21, 1943 |